FIG. 1

INVENTOR.
ROGER E. CLAPP

FIG. 2

Jan. 30, 1968 R. E. CLAPP 3,366,829
INTERACTIONS BETWEEN WAVES AND ELECTRONS
Filed Jan. 19, 1965 9 Sheets-Sheet 3

FIG. 3

INVENTOR.
ROGER E. CLAPP
BY
Kenway, Jenney + Hildreth
ATTORNEYS

FIG. 5

Jan. 30, 1968 R. E. CLAPP 3,366,829
INTERACTIONS BETWEEN WAVES AND ELECTRONS
Filed Jan. 19, 1965 9 Sheets-Sheet 6

INVENTOR.
ROGER E. CLAPP
BY
Kenway, Jenney & Hildreth
ATTORNEYS

INVENTOR.
ROGER E. CLAPP
BY
Kenway, Jenney & Hildreth
ATTORNEYS

FIG. 11

United States Patent Office 3,366,829
Patented Jan. 30, 1968

3,366,829
INTERACTIONS BETWEEN WAVES
AND ELECTRONS
Roger E. Clapp, 44 Coolidge Ave.,
Cambridge, Mass. 02138
Filed Jan. 19, 1965, Ser. No. 426,614
20 Claims. (Cl. 315—3)

This invention deals with interactions between an electromagnetic wave and a stream of electrons, and particularly with those interactions by which an incoming wave acts to break a uniform stream of electrons into discrete bunches; i.e., to modulate the density of a stream or beam; and vice versa, i.e., interactions by which the individual bunches of a density-modulated beam or stream of electrons acts to generate a utilizable electromagnetic wave. The object of the invention is to promote interactions of this type at higher frequencies than has heretofore been possible.

A well known approach to the amplification of electromagnetic waves is to pass a beam of electrons through two units termed, respectively, "buncher" and "catcher," that are spaced apart by a field-free region termed a "drift space." An incoming signal to be amplified is applied to the buncher. The buncher acts, in response to the signal, to accelerate some electrons and to retard others; i.e., to modulate the velocities of the electrons of the beam. As the beam proceeds through the drift space, the accelerated electrons forge ahead of the unaffected ones and the retarded ones lag behind, thus to convert the velocity modulations imparted by the buncher into density modulations of the beam. The parade of bunches thus developed in the drift space now passes through the catcher which converts them into an outgoing signal. By virtue of the cumulative action which takes place in the drift space, the outgoing signal may be of much greater strength than the incoming signal.

The bunchers and catchers commonly employed are cavity resonators. Hence their overall internal dimensions are critically related to the frequencies of the waves of interest; i.e., the higher the frequency, the smaller the resonator. For waves whose lengths are a few millimeters fabrication of a suitable resonator is difficult; and for waves whose lengths are a few tenths of a millimeter, the difficulties may be prohibitive. Even when it is possible to fabricate such a resonator, because of its minute volume, its power handling capacity can be so small as to render it practically useless.

The invention offers, as an ultrahigh frequency alternative to the cavity resonator, a stack of ribbon-like wave guides which acts to convert an incident plane wave into a wave of undulating front, or vice versa. Each wave guide in the stack is constituted of a slab of dielectric material bounded by conducting sheets. Odd numbered slabs have refractive indices $n_1$, while even numbered sheets have refractive indices $n_2$, and the magnitudes of the two refractive indices, $n_1$ and $n_2$ are so coordinated with the geometrical lengths of the slabs, in the direction of wave propagation through them, that the electrical path lengths for waves traveling through them differ, from each slab to the next, by one-half wavelength or an odd number of half wavelengths.

In one form of the invention a plane wave to be amplified is incident on one face of the stack while a beam of electrons, advantageously in the form of a sheet or ribbon, passes by the other face. The stack converts the incident plane wave front into an emergent wave having a front which undulates with a wavelength equal to twice the slab thickness, and the resulting undulating electric field acts on the passing electrons to accelerate some and decelerate others, thus to initiate the bunching action. Because the slabs are thin the influence of any single slab on the electron beam is small; but because the buncher stack as a whole may include a large number of slabs, their actions are cumulative. Moreover, fabrication of such a stack is simple, even when the slabs are proportioned for operation with waves of millimeter wavelengths. The catcher may be similar and similarly disposed with relation to the electron beam, but at the far end of a drift space. The beam, bunched by the action of the drift space, induces electric fields in the beam-adjacent ends of the several slabs, and these fields alternate in polarity from each slab to the next. These fields then travel as waves from end to end of the slabs and emerge as a composite wave which, because of the differential of one-half wavelength between the electrical path lengths within the slabs, has an essentially plane wave front.

Each slab, and hence the entire stack, may operate by one way transmission from one end, which may be termed the wave end, to the other which may be termed the beam end, or vice versa. In this case, which will be termed the first form of the invention, the half wave difference between the electrical path lengths of adjacent slabs is measured from end to end. Equally well, slabs and stack may operate by round trip transmission, i.e., from one end to the other and return, reflection after the forward trip being substantially complete. In this case, termed the second form, the wave ends and the beam ends are one and the same, the other ends serving merely as reflectors, and the half wave difference between the electrical path lengths is measured on the round trip basis. Evidently the end-to-end lengths, both electrical and geometrical, are half as great in the second case as in the first.

The second form of the invention offers a further advantage by presenting a favorable impedance to the incident wave in that, in the wave of undulating front which thus emerges at the wave-receiving face of the stack, those portions which emerge from slabs of lower refractive index lead the incident wave in phase while those portions which emerge from slabs of higher refractive index lag it in phase. Thus the incident wave "sees" an impedance composed of reactances that are alternately capacitive and inductive in character. These effective reactances are effectively connected together in series, thus to form an effective series resonant circuit. The incident wave is thus presented with a very low impedance. Especially when the angle of incidence of the incoming wave is oblique, this low impedance is of advantage in assisting the passage of the wave from side to side of the stack.

Apparatus embodying the invention may take many different forms. In each case the choice between a one-way transmission stack and a two-way transmission stack will be dictated in part by convenience and in part by the use to which the apparatus is put. While the second form offers an impedance advantage, the first form provides an advantage in the clear separation of the part of the apparatus containing the electron beam from the part of the apparatus containing the electromagnetic plane waves. As with amplifiers of other types, a portion of the output power may be fed back to the input point, thus to maintain self oscillations.

The invention will be fully apprehended from the following detailed description of illustrative embodiments thereof, taken in connection with the appended drawings, in which.

Figure 1:
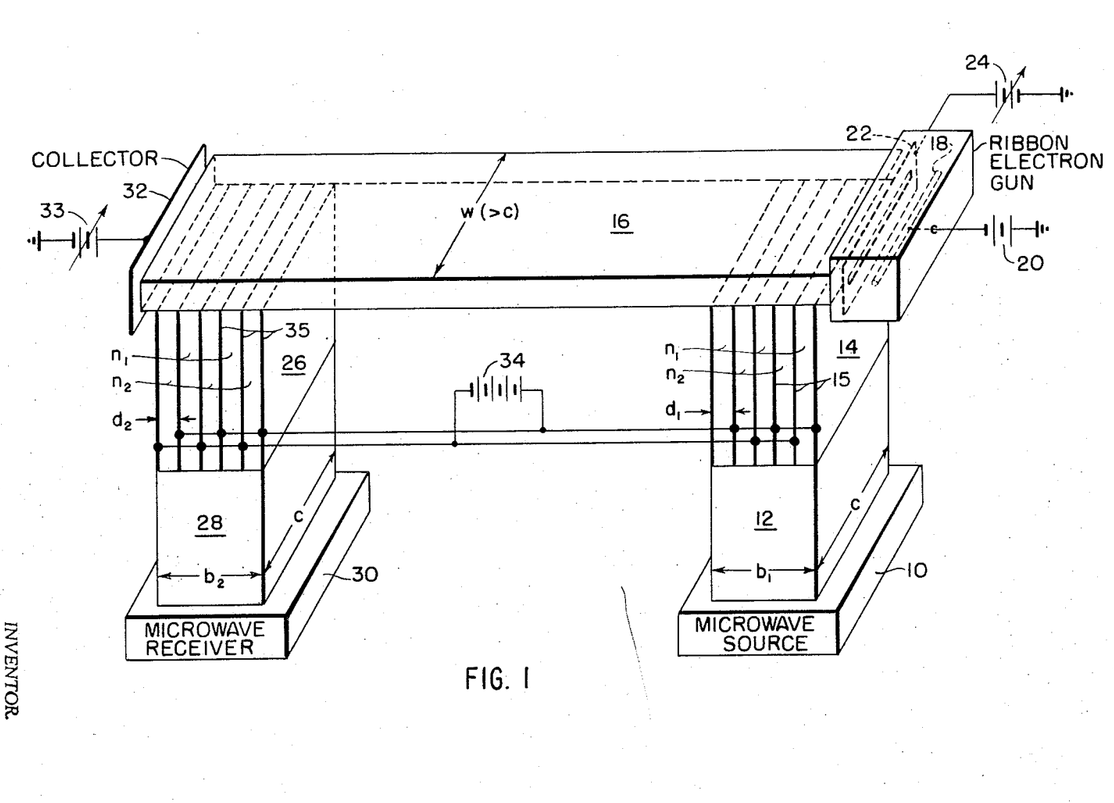
FIG. 1 is a perspective diagram, partly in section, showing an amplifier embodying the invention in one of its simpler forms.

Referring now to FIG. 1, microwave energy originating in a source 10 travels through a waveguide 12 of rectangular cross-section to impinge on the lower face of a dielectric wave guide stack 14. As is well understood, the long dimension of the cross-section of the waveguide 12, here designated $c$, determines its cutoff frequency while the short dimension of the cross section, here designated $b_1$, determines only the power which it may carry; provided of course it is operated in its dominant mode. To ensure that the guide 12 shall operate in its dominant mode, the long dimension $c$ should be somewhat greater than one half wavelength while the short dimension $b_1$ should be somewhat less than one half wavelength. Illustratively, the dimension $c$ may be ¾ wavelength and the dimension $b_1$ may be ⅜ wavelength.

The microwave energy thus carried from the source by the supply guide 12 is incident normally on the lower face of the stack 14 of the invention and hence on the lower ends of its constituent dielectric slabs. This stack 14 is composed of alternate slabs of dielectric material having a refractive index $n_1$, alternating with slabs of a different dielectric material having an index of refraction $n_2$. Advantageously, both materials are solids. Each slab is separated from its neighbors by a sheet 15 of conducting material such as copper. The width of the entire stack 14 is equal to the width $c$ of the supply waveguide 12, while the thicknesses of the individual slabs, here designated $d_1$, are much less. In the present illustration with five slabs and disregarding the thicknesses of the conducting sheets 15 which separate them, the thickness of each slab is ⅕ of the short dimension $b_1$ of the cross-section of the supply waveguide 12. That is to say $d_1 = b_1/5$.

Adjacent the upper face of the stack 14 is a closed tube 16 of which the upper face of the stack 14 constitutes the lower bounding surface. The tube 16 is of rectangular cross-section, its width W being somewhat greater than the dimension $c$. Its function is to carry an electron beam from a gun past the upper end of the stack, through a drift space and past the upper end of a similar stack to a collector of spent electrons. Hence its depth is determined solely by electron focusing considerations. That is to say, its depth should be as small as possible consistently with the requirement that electrons of the beam to be described should not strike its walls before reaching the collector. A longitudinal magnetic field or any other appropriate technique may, if desired, be employed to aid in focusing the beam.

At the righthand end of the tube is an electron gun proportioned to deliver a thin ribbon-like beam of electrons of a width equal to or somewhat greater than the dimension $c$. It may comprise an elongated cathode 18, held at a negative potential, as by a potential source 20 and an accelerating anode 22 held at a positive potential as by a potential source 24, and pierced by an elongated aperture to receive the ribbon beam originating in the cathode 18. It may also contain focusing electrodes of suitable configuration and carrying suitable potentials. In order not to confuse the drawing with irrelevant details, such electrodes are not shown.

Electron guns for generating ribbon-like beams of electrons are well known and have been turned to account in various ways, for example, in Adams Patent 2,592,228 and in Carbrey-Feldman Patent 2,961,492. FIG. 9 of the last named patent shows the details of construction of a suitable electron gun.

The requirements on the dielectric materials of the stack 14 are simply that they should be fairly transparent to microwaves of the desired frequencies and that their indices of refraction, $n_1$ and $n_2$ respectively, should differ significantly in their values. Two materials which meet these requirements are hot pressed boron nitride of which the refractive index is 4.8 and aluminum oxide of which the refractive index is 9.8. These two refractive indices stand very nearly in the ratio of 2 to 1. Given that the free space wavelength of the incident radiation is 6 centimeters so that ½ wavelength is equal to 3 centimeters, the length of each slab containing dielectric material of refractive index $n_1 = 4.8$ and embracing one half wavelength is equal to 3 cm./4.8 or 6.25 millimeters, while the length of each slab containing material of refractive index $n_2 = 9.8$, and embracing two half wavelengths is 6 cm./9.8 or 6.13 millimeters. By adjustment of the slabs to the average length of 6.19 mm., the boron nitride slabs will thus embrace, very closely, one half wavelength while the aluminum oxide slabs will embrace, equally closely, two half wavelengths. Hence, for a plane wave incident on the lower face of the stack 14 the component waves which emerge from the upper ends of any two adjacent slabs are in phase opposition; i.e., at an instant at which the polarity of the component wave emerging from a slab of refractive index $n_1$ is positive, the polarities of the component waves emerging from the adjacent slabs of refractive indices $n_2$ are negative. These component waves together constitute a wave, emerging from the upper face of the stack 14 as a whole, of which the wave front undulates, along the upper face of the stack, with a wavelength equal to $2d_1$, or two stack steps; that is to say, its polarity alternates or reverses from each slab to the next.

For the sake of clarity of presentation, the lengths of the slabs as shown in the drawing are much exaggerated.

The thicknesses of the slabs, that is to say, their dimensions in the direction of the travel of the electron beam, are determined by the consideration that each electron should travel a distance very slightly less than two steps of the stack in each full period of the incident wave. Disregarding, for the present, the slight departure from equality, this means that in each full period of the incident radiation, that is to say the time which elapses between the instant at which one plane wave front strikes the lower face of the stack 14 and the instant at which the next plane wave front strikes it, the electrons will have traveled a distance $2d_1$. During this same time the wave which emerges from the upper face of the stack into the beam-carrying tube 16 will also have passed through one full cycle. For example, suppose that at one instant the emergent wave is positive at the upper ends of all the slabs of refractive index $n_1$ and negative at the upper ends of the slabs of refractive index $n_2$. One-half period later this condition will have been inverted. After the next one-half period it will have been restored. In other words the space undulations of the emergent wave alternate in polarity at the frequency of the incident wave. The emergent wave is thus a standing alternating wave in contrast to a traveling alternating wave.

It is well recognized in other connections that a standing alternating wave may be resolved into two traveling waves of like amplitudes advancing in opposite directions. The same is true here, and the traveling wave which is effective in modulating the velocities of the electrons of the beam is the one which travels at nearly the same speed as the speed of transport of the electron beam, the one which travels in the opposite direction having substantially no influence on the electron beam. The forward wave, i.e., the one which travels from right to left in the drawing and which travels at a speed very slightly, perhaps one percent, faster than the speed of transport of the electrons, exerts electrostatic forces on them, tending to accelerate some and retard others, thus to promote incipient density modulations of the electron beam or, to employ the term now commonly employed, to promote bunching of the electrons.

The beam of electrons thus acted upon now passes into a drift space defined by the tube 16 in which those which have been accelerated forge ahead and those which have been retarded lag behind. The bunching effect is thus greatly increased as the beam travels through the drift space. At a suitable distance from the electron gun, where the bunching shall have reached suitable proportions, there is placed, in accordance with the invention, another dielectric waveguide stack 26 which may be the same as the first stack 14 except for the fact that in this stack 26 which operates as a catcher or de-buncher, the thicknesses $d_2$ of the dielectric slabs may be slightly less than those of the buncher stack 14 in order that, with no change in the velocity of the transport of the electron beam, the electron bunches should travel over the upper face of the stack 26 slightly faster than the useful component traveling wave which they induce as they pass over the several slabs in succession. As each electron bunch, or region of high density of the electron beam passes over the upper end of a slab it induces in it an electric field of one polarity while, as the low density parts of the beam between successive bunches pass over the upper end of the same slab, they induce fields in it which, relative to the average field, are of opposite polarity. These electric fields then travel through the several slabs from their upper ends to their lower ends as guided waves, to emerge from the lower face of the stack 26 as a composite wave. The lengths of the slabs being coordinated with their indices of refraction in the fashion described above for the stack 14, the contributions from two adjacent slabs, although excited with opposite polarity, emerge with the same polarity and combine coherently to constitute, together with the contributions of the other slabs in stack 26, a plane wave in the wave guide 28. Moreover, by virtue of the action of the drift space in converting the velocity modulations imparted to the electrons of the beam by the stack 14 into bunches of widely disparate charge densities, the wave emerging from the lower face of the stack 26 is much amplified as compared with the wave incident on the lower face of the stack 14. This composite wave is carried by the wave guide 28 to a microwave receiver 30 of any desired sort. Having served their purposes, the electrons of the beam are finally removed by a collector 32.

To simplify fabrication, it may be preferred to construct the catcher stack 26 with the same dimensions as the buncher stack 14, i.e., $d_2=d_1$, and to secure the small discrepancy between wave speed and electron beam transport speed through the agency of a small accelerating potential in the drift space, sufficient to cause the electrons to travel slightly faster, e.g., by two percent, over the catcher stack 26 than over the buncher stack 14. To this end the potential on the collector 32 may be somewhat greater than that on the anode 22, the excess being determined by adjustment of the sources 24, 33.

To accentuate the influence of the buncher stack 14 on the ribbon beam and of the density modulated beam on the catcher stack 26, the beam should advantageously be caused to pass as close as possible to the upper faces of the two stacks. For this purpose it should be focused into as thin a ribbon as possible. Following teachings that are now well known in other fields, such focusing can be achieved by the technique of introducing supplementary steady fields that alternate in polarity from point to point along the faces of the stacks. This technique is broadly known as alternate gradient focusing. The conducting sheets 15, 35 which separate each slab from its neighbors serve as convenient electrodes for the purpose. To this end alternate sheets 15 are connected to the positive terminal of a potential source 34 and the others to its negative terminal. The same technique may be employed in the modifications to be described below although, in the interests of clarity of the drawings, it is in most cases not shown.

Figure 2:
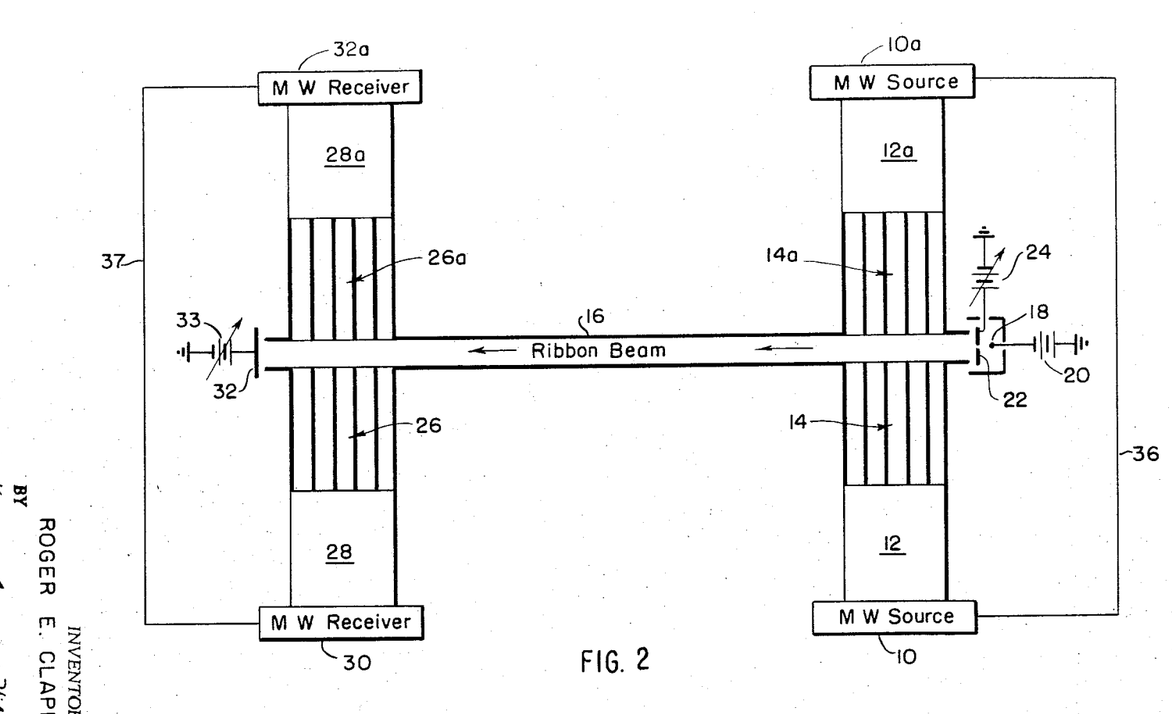
FIG. 2 is a schematic diagram showing an extension of the amplifier of FIG. 1.

However effective the focusing of the ribbon beam may be its density modulations, with the single sided arrangement of FIG. 1, are of necessity most pronounced on the lower margin of the beam and weakest on the upper margin. But by duplicating both the input stack 14 and the output stack 26 as shown in FIG. 2, bunching may be effected to the same extent on the upper surface of the beam as on its lower surface, being least along the centerline of the beam. Here the upper and lower microwave sources 10, 10a must deliver to the upper and lower stacks 14, 14a waves that are in phase coherence as indicated by a conductor 36 which interconnects them. A similar phasing conductor 37 interconnects the two microwave receivers 30, 30a.

Figure 3:
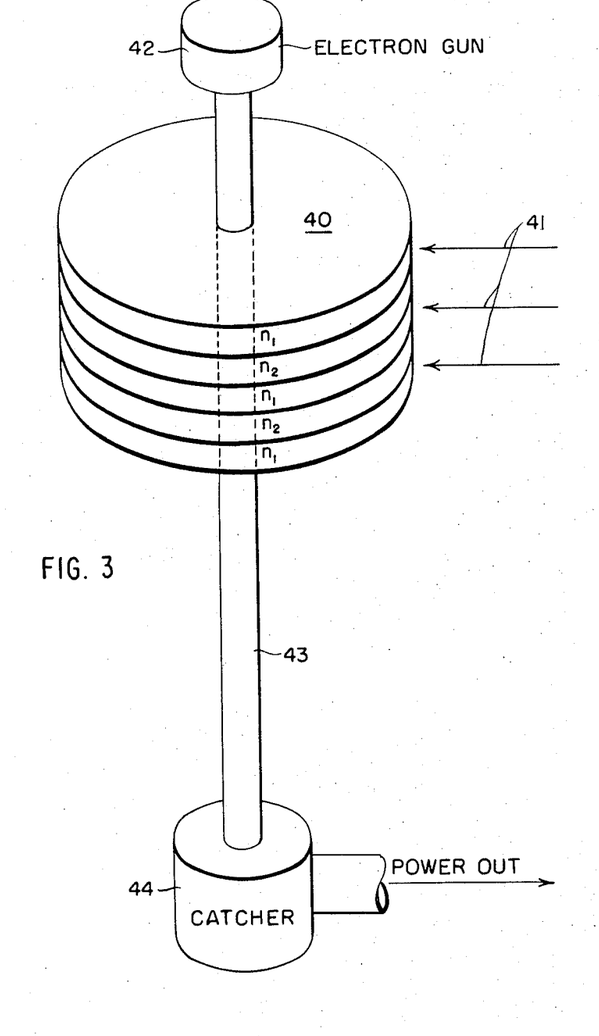
FIG. 3 is a perspective diagram, partly in section, showing a radiation receptor embodying the invention.

The wave-converting stacks of FIGS. 1 and 2 are rectangular as seen along any axis. This need not, however, always be the case. FIG. 3 is a perspective diagram showing a stack 40 of circular discs of dielectric material, each separated from its neighbors by a sheet of conducting material, the refractive indices of the discs being coordinated with their radii in the fashion described above for the lengths of the slabs of FIG. 1. Such a stack of discs receives radiation 41 arriving from any direction and hence may serve as an omnidirectional antenna. To recover and amplify the energy carried by the radiation an electron gun 42 is provided and is proportioned to deliver a beam having the form of a pencil or, better still, of a hollow tube of electrons which travels from end to end of the stack through central holes which pierce all the slabs and separating sheets. Weak incoming energy which is incident on the outer surfaces of the circular slabs is to some extent concentrated as it travels radially from the peripheries of the slabs toward their centers where it acts in the fashion described in connection with FIG. 1 to modulate the velocity of the beam electrons. With their velocities thus modulated the electrons of the beam travel through a drift space defined by a tube 43 where the velocity modulations are gradually converted into density modulations. At the far end of the drift space they pass through a catcher 44 of any desired construction from which amplified power may be withdrawn.

Figure 4:
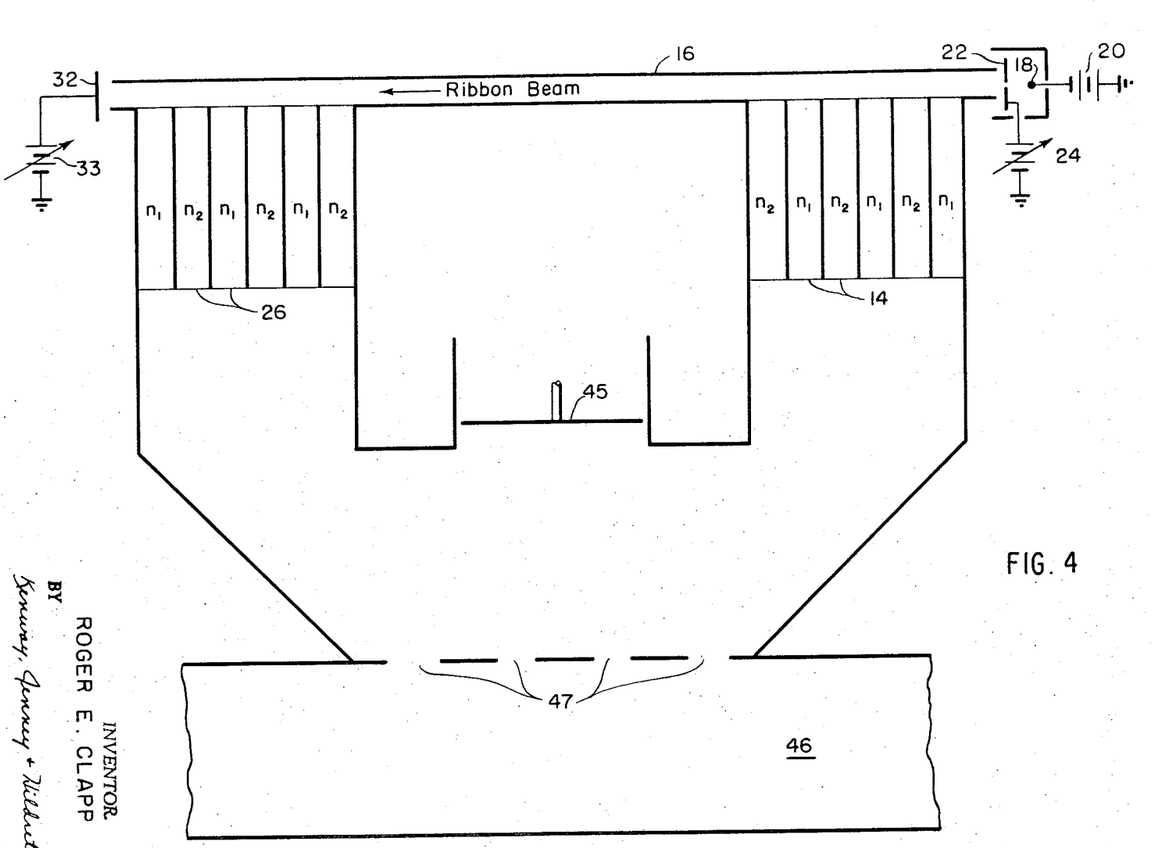
FIG. 4 is a schematic diagram showing a self-oscillator embodying the invention.

The amplifier of any of the foregoing figures may be converted into a self-oscillator in accordance with well known principles by feeding back a portion of its amplified output energy to its input point. For fully regenerative action the path length of the loop should embrace an integral number of wavelengths. FIG. 4 shows an oscillator developed in this fashion from the amplifier of FIG. 1. Rough adjustment of the path length around the loop to the required integral number of full wavelengths can be made in the fabrication of the apparatus. Final adjustment may be effected by tuning, to which end a tuning stub 45 is indicated. Power may be withdrawn through a wave guide 46 connected to the loop through a directional coupler 47.

In the apparatus of FIGS. 1, 2 and 4 the incoming wave is incident normally on the input face of the buncher stack 14 and emerges normally from the output face of the catcher stack 26. In FIG. 3 the radiation is shown as likewise incident normally on the outer surface of the disc stack 40 although, if the principles to be described in connection with FIG. 5 are followed, the apparatus may be proportioned for preferential acceptance of radiation arriving from some different direction.

Figure 5:
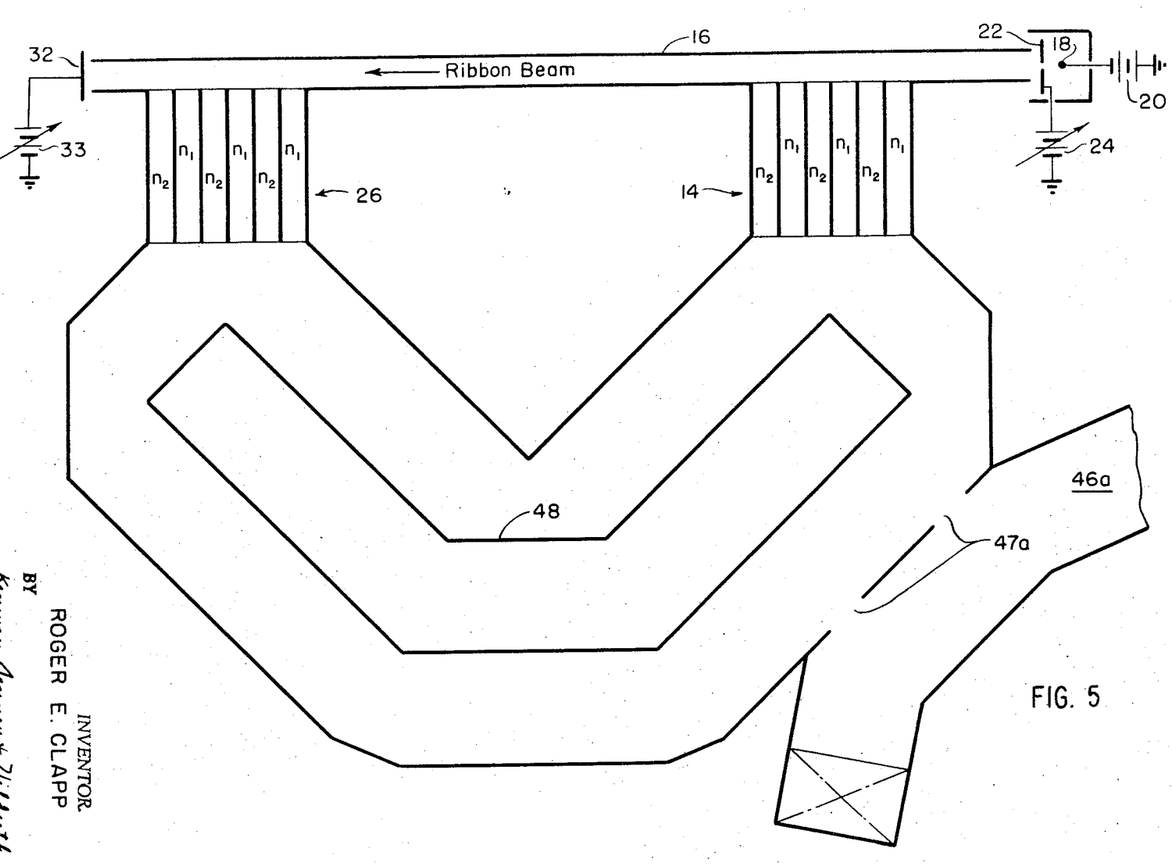
FIG. 5 is a schematic diagram showing a modification of the oscillator of FIG. 4.

In FIG. 5 the input wave is incident on the lower face of the buncher stack 14 at an angle of 45°. After reflection from this face and on another reflecting surface 48 it is again incident at the same angle of 45° on the lower face of the catcher stack 26 from which it is reflected at the same angle to continue around the loop. Since the loop is a closed one the apparatus can operate either as an oscillator or as a regenerative amplifier. The electron gun 18–24 the beam-carrying tube 16 and the collector 32, 33 may be identical with those of FIG. 1. The dielectric stacks 14, 26 may be composed of the same materials as those of FIG. 1 and arranged in the same way and with the same dimensions except for one important difference: the thicknesses of the several slabs of the stack are somewhat greater than the thicknesses of the corresponding slabs in the apparatus of FIG. 1. This sole difference stems from the oblique angles which both the incident and reflected waves make with the lower faces of the stacks 14, 26, as will be understood from the following considerations.

As before, the electron time of interest is the time which elapses between the passage of an electron of the beam from a point above one slab of the buncher stack to a point above the slab next but one. Aside from the small excess of wave speed over electron transport speed desirable for most efficient energy transfer (and this excess is only of the order of 1%) this time is no longer to be equated to the period of the incoming wave, unmodified, but rather to the time which elapses between the incidence of one wave front on the lower end of one slab and the incidence of the following wave front on the lower end of the slab next but one.

Figure 5A:
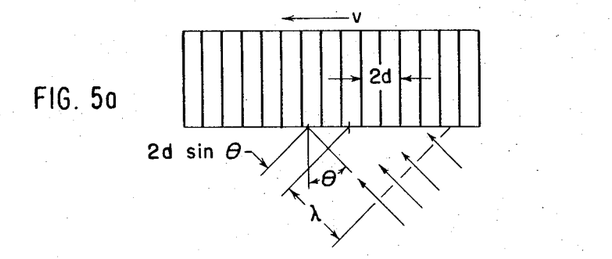
FIGS. 5a and 9a are diagrams of assistance in the exposition of the invention.

Thus, referring to FIG. 5a, if $d$ = one stack step; i.e., thickness of one slab and one conducting sheet,
$v$ = velocity of transport of electron beam,
$c$ = phase velocity of wave in supply guide,
$\lambda$ = wavelength in supply guide,
$T$ = period of incident wave,
$t$ = electron time of interest,
$\theta$ = angle of incidence of wave on face of stack,
$\Delta T$ = time for incident wave front to advance two stack steps, then $$T = \frac{\lambda}{c}, \Delta T = \frac{2d \sin \theta}{c}$$

$$T + \Delta T = \frac{\lambda + 2d \sin \theta}{c}$$

$$t = \frac{2d}{v}$$

But since, for coordinated advance of the electron stream and the emergent undulating wave, $t = T + \Delta T$, it follows that $$2\frac{d}{v} = \frac{\lambda}{c} + \frac{2d \sin \theta}{c}$$

This equation thus gives the slab thickness as a function of the wavelength and angle of incidence of the incident wave and of the velocity of the electron stream. Because the electron transport speed $v$ is never more than a small fraction, say 10 percent, of the phase velocity $c$, the second term on the righthand side of the foregoing expression is never more than a small correction on the first term. Hence, in every case, $$2\frac{d}{v} \doteq \frac{\lambda}{c}$$

or $$2d \doteq \frac{v}{c}\lambda$$

The righthand side of this last expression is evidently the wavelength of the emergent undulating wave; and this expression states that it is always comparable with the thickness of two slabs and two conducting sheets; i.e., with two stack steps. Use of incidence and reflection angles that are oblique, as in FIG. 5, provides still another means for coordinating the wave speeds at the faces of the buncher stack and the catcher stack, respectively, with the electron stream transport speed. Thus, to cause the buncher wave to advance slightly faster than the stream and the catcher wave slightly slower, the angles which the supply guide and the energy-withdrawal guide make with the lower face of the stack may be smaller in the case of the buncher stack than in the case of the catcher stack.

It will be noted that the angle $\theta$, and hence the correction term $2d \sin \theta$, may be positive or negative. The positive sign corresponds to wave propagation having a component in the same direction as the electron stream velocity, i.e., forward wave bunching, and the negative sign corresponds to wave propagation having a component in the reverse direction, i.e., backward wave bunching. In each case, the undulating wave which emerges from the upper end of the stack is not a stationary or standing wave, but is a composite wave which can be resolved into a forward and a backward traveling wave of which the velocities are unequal, in the same direction as the electron stream.

Figure 6:
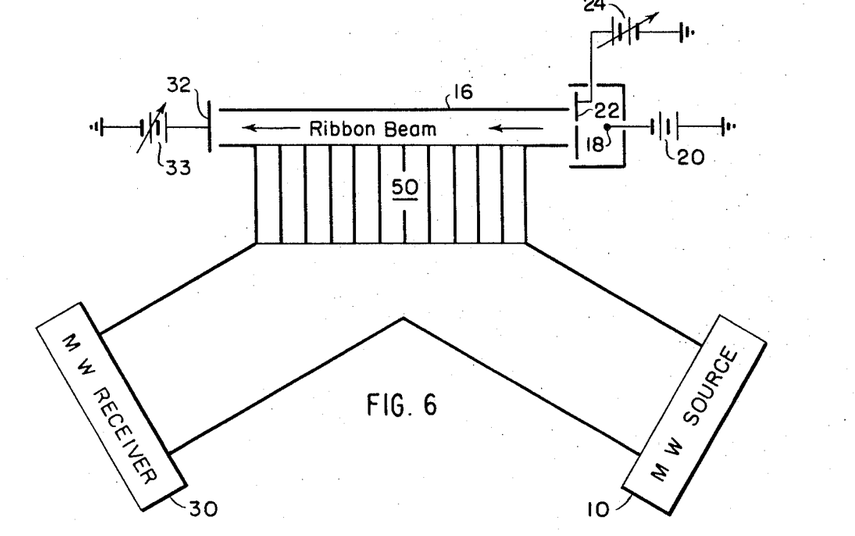
FIG. 6 is a schematic diagram showing an amplifier utilizing a single stack on which waves are incident obliquely.

FIG. 6 shows an amplifier in which the buncher and catcher stacks are coalesced, and in which the incoming wave is incident on a stack 50 at an angle of 60° and the amplified wave emerges from it at the same angle.

Figure 7:
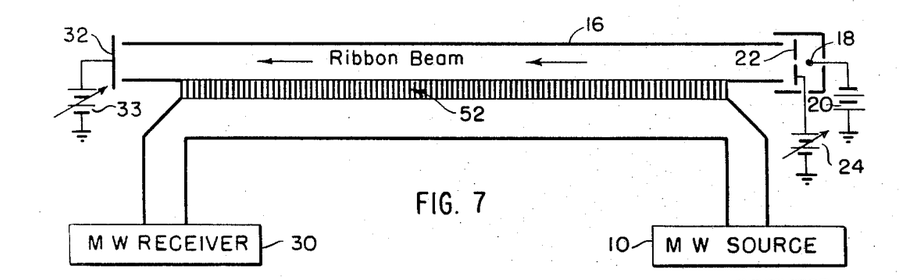
FIG. 7 is a schematic diagram showing an amplifier in which the dielectric stack of the invention is continuous from end to end of the apparatus and in which the waves to be amplified travel along a path substantially parallel with that of the electron beam.

The angle of incidence of the wave on the stack may have any value between −90° and +90°. In the cases of normal incidence, for example in FIG. 1, the angle is zero. In the illustration of FIG. 5 it is +45°. It may equally well, however, be 90° which signifies grazing incidence and FIG. 7 shows an amplifier in which the angle of incidence on a stack 52 is grazing, that is to say, in which the angle $\theta$ has the value of +90°. Evidently for such a case the foregoing formula which relates stack thickness to angle of incidence, wavelength of radiation and the velocities of the wave and of the beam, respectively, reduces to:

$$\frac{2d}{v} = \frac{\lambda + 2d}{c}$$

Another feature shown in FIG. 7, as also in FIG. 6, is that the stack is continuous from end to end of the apparatus. In each case the slabs which are nearer to the electron gun serve principally to modulate the velocities of the beam electrons which pass them, while the slabs at the far end serve principally as catcher slabs to convert the resulting bunches in the electron beam into outgoing radiation which then travels through a wave guide to a microwave receiver. This embodiment and others in which the electromagnetic wave travels in a direction essentially parallel with the lower face of the stack is especially suitable in the quasi-optical frequency range, that is to say, in which the lengths of the waves are a few millimeters or a few tenths of a millimeter, in which case optical techniques, including lenses and reflectors, may be employed to direct the electromagnetic wave along the desired paths in contrast to the containment of the wave in a wave guide as is required for waves of the longer wavelengths.

Figure 8:
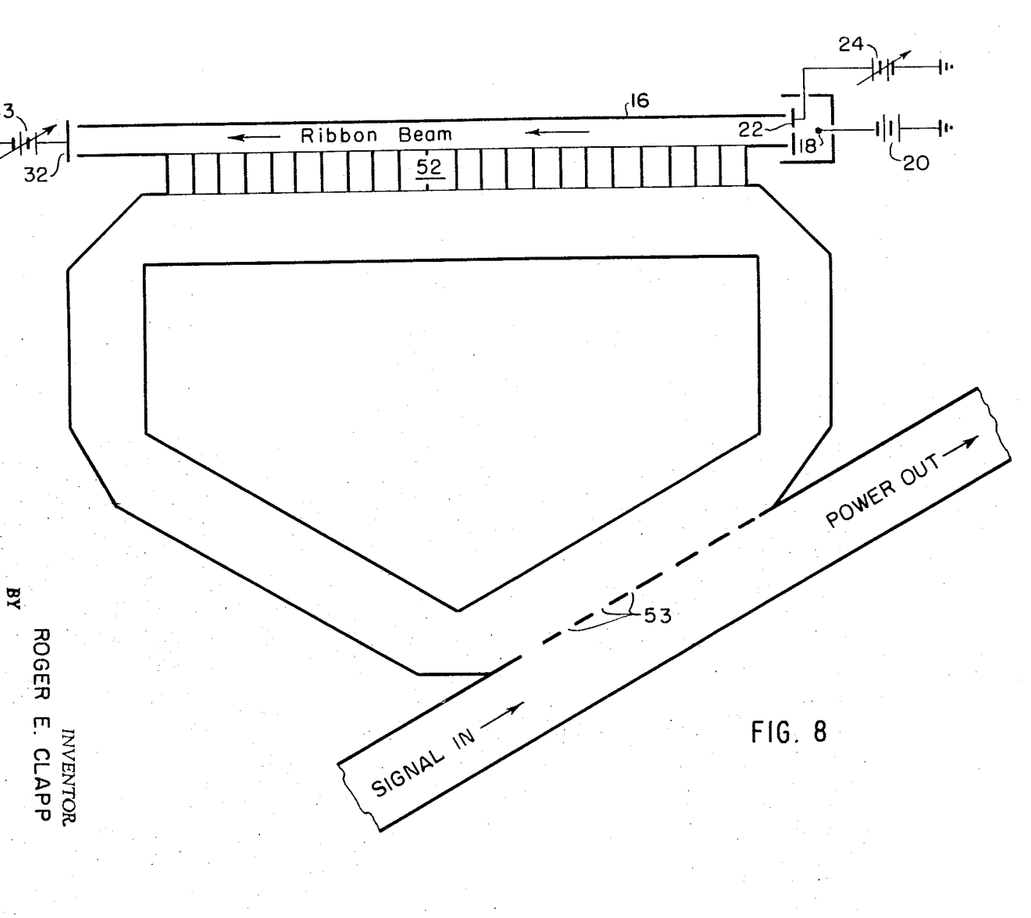
FIG. 8 is a schematic diagram showing the fashion in which the amplifier of FIG. 7 may be converted into a self-oscillator.

By turning the wave guide of FIG. 7 back upon itself to form a closed loop of correct mean length, the apparatus of FIG. 7 may readily be converted into a self-oscillator as in FIG. 8 where, as before, power may be withdrawn through a directional coupler 53.

When bandwidth is not of importance, a low-level signal may be greatly amplified by turning regeneration to account; i.e., by providing a closed loop, as in FIG. 8 in which the net losses are such as barely to prevent self oscillation. The signal to be amplified may enter the loop by way of the same directional coupler 53 as that by which its amplified counterpart is withdrawn. The same refinement can readily be introduced into other embodiments such as those of FIGS. 4 and 5.

In the embodiments heretofore described, the dielectric stack of the invention operates by virtue of transmission from end to end through each dielectric slab, the electromagnetic wave being incident on one face of the stack and emergent from the opposite face, along which the electron beam passes.

Figures 9, 9A:
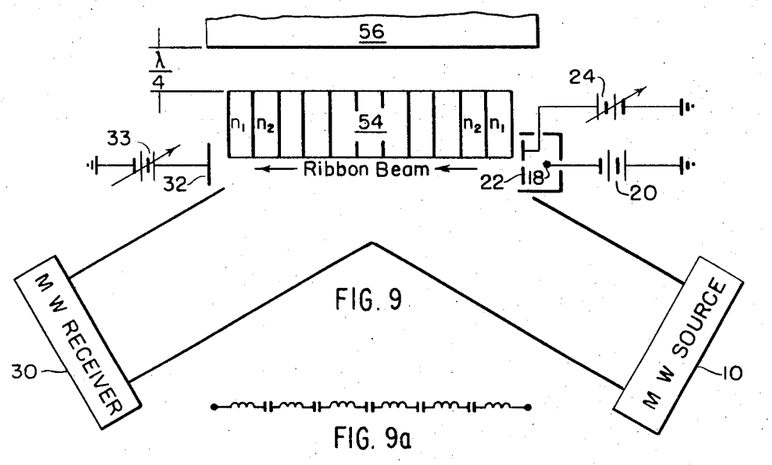
FIG. 9 is a schematic diagram illustrating the invention in its second form.

FIG. 9 shows an amplifier, otherwise the same as that of FIG. 6, embodying the invention in a different form. Here each slab of a stack 54 acts on the electron stream by virtue of a round trip of the wave energy in it. Thus, considering those slabs located close to the electron gun which, as stated heretofore, operate principally as bunchers, the input wave originating in a microwave source and approaching the stack at an oblique angle enters the lower ends of the slabs, travels to their upper ends where it is reflected as completely as possible and returns to their lower ends. With proper coordination between the lengths of the slabs and the indices of refraction of their dielectric materials this results, for an incident wave of plane wave front, in an emergent reflected wave of undulating wave front. This coordination is achieved by proportioning the lengths of the slabs in relation to their refractive indices in such a way that their round trip electrical path lengths differ by ½ wavelength. This means that their one-way electrical lengths differ by ¼ wavelength. Thus the lower face of the stack 54 is the active one, not only from the standpoint of the incident and emergent electromagnetic waves, but also from the standpoint of the electron beam which is developed by the electron gun and of which the spent electrons are collected by the collector. Means are well known in the art by which such a beam can be developed and focused. In this case it is of course necessary that the interaction region be evacuated.

The undulations in the emergent wave front represent portions of it that lead its average position and other portions that lag. In the terminology of electric circuits the source of the incident wave therefore "sees" a succession of reactances, of which alternate ones are capacitive and the others inductive. These reactances are effectively connected in series from the standpoint of the incident wave. Hence, the source "sees" a very low impedance shown in FIG. 9a, close to the face of the stack. The series-resonant circuit which is "seen" by the source wave serves in effect as a low-impedance reflection plane for the incident plane wave. At the same time, the circuit resonance produces large local electric fields at the slab entrances, electric fields of alternating polarity which can individually be much larger than the electric fields associated with the incident plane waves.

To make the most of the round trip arrangement of FIG. 9 it is desirable that the reflection at the upper ends of the slabs of the stack be as perfect as possible. The coefficient of reflection can be improved by the provision of a metal block 56 spaced from the upper ends of the solid dielectric slabs by ¼ wavelength of a suitable dielectric, for example, air. This quarter wavelength spacing transforms the effective short-circuit provided by the surface of the block 56 into a very high impedance in contact with the upper end of each slab and thus goes far toward making the upper face of the stack a perfect reflector.

With the minute wavelengths contemplated, and consequently the small dimensions of the apparatus, it presents no serious problem to evacuate the entire apparatus instead of merely the wave guides of FIG. 9. Given that the wavelengths of interest lie in the quasi-optical range so that the direction of wave movement is best altered by reflection instead of by bending of a wave guide, the wave guides of FIG. 9 serve little purpose and the apparatus of FIG. 9 may readily be converted into a self oscillator as in FIG. 10 by the substitution of two mirrors 58, 60, disposed at the proper angles, one for the microwave source of FIG. 9 and the other for its microwave receiver. Power can be withdrawn at the quasi-optical wavelengths at which the apparatus operates by arranging that one of the mirrors, illustratively the mirror 60, be partially transmissive or translucent to the waves of interest.

Figure 10:
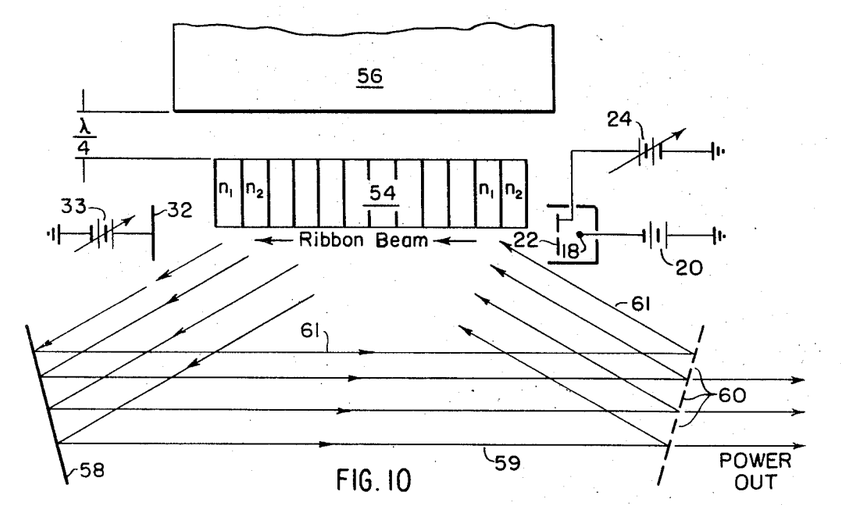
FIG. 10 is a schematic diagram showing a generator of energy of quasi-optical wavelengths.

It may be noted that the apparatus of FIG. 10 includes three reflecting surfaces, i.e. the lower face of the stack 54 and the mirrors 58 and 60. This is an odd number of reflectors, and it is apparent from the arrows drawn in FIG. 10 that the result is to invert the power distribution in the circulating electromagnetic wave after each circuit. This inversion of the power distribution results in greatly improved efficiency in the regenerative action of the apparatus as compared with an otherwise similar configuration having an even number of reflecting surfaces.

It is apparent, for example, that the lower ray 59, after traveling from mirror 58 to mirror 60, is reflected by mirror 60 and travels toward the left-hand end of the stack 54, where it is reflected with amplification, since this end of the stack acts primarily as a catcher. After this reflection the ray is reflected from the upper part of mirror 58 and now travels as ray 61 from mirror 58 to the upper part of mirror 60, being reflected there and proceeding toward the right-hand part of the stack 54. Since this part of the stack serves primarily for bunching of the electron beam, power is absorbed from the part of the electromagnetic wave represented by the ray 61. However, after reflection from the stack, this ray travels toward the lower part of the mirror 58 and is reflected there, traveling toward mirror 60 along the ray path 59. As described above, this ray 59, after reflection from mirror 60, travels toward the left-hand or catcher end of the stack, where amplification takes place. Thus, with an odd number of reflections in the regenerative loop, a particular part of the electromagnetic wave alternately participates in bunching and in catching action, losing power in the course of the bunching interaction but regaining this power and more in the course of the catching interaction, thus acquiring a net increase of power after every two circuits of the loop.

With such an arrangement the circulating wave "links up" only after two round trips, instead of one, as in the oscillators described above. Hence, for fully regenerative action, the mean path length around the loop should be an integral number of half wavelengths.

With quasi-optical waves whose wavelengths are a few millimeters or a few fractions of a millimeter and with wave guides of dimensions sufficient to carry an adequate amount of power, the dimensions of the cross-section of a rectangular wave guide will normally be a fairly large number of half wavelengths along each of its sides. In this case mode conversion may take place from waves of the desired dominant mode into waves of widely different modes and this may seriously distort the wave front of the incident wave as it impinges on the input face of the dielectric stack. Undesired modes and waves of spurious frequencies may, however, be eliminated by the introduction, at any suitable point of the wave guide, or at any suitable point of the unguided optical path, of a suitable filter. At the quasi-optical frequencies a Fabry-Perot resonator serves the purpose.

Figure 11:
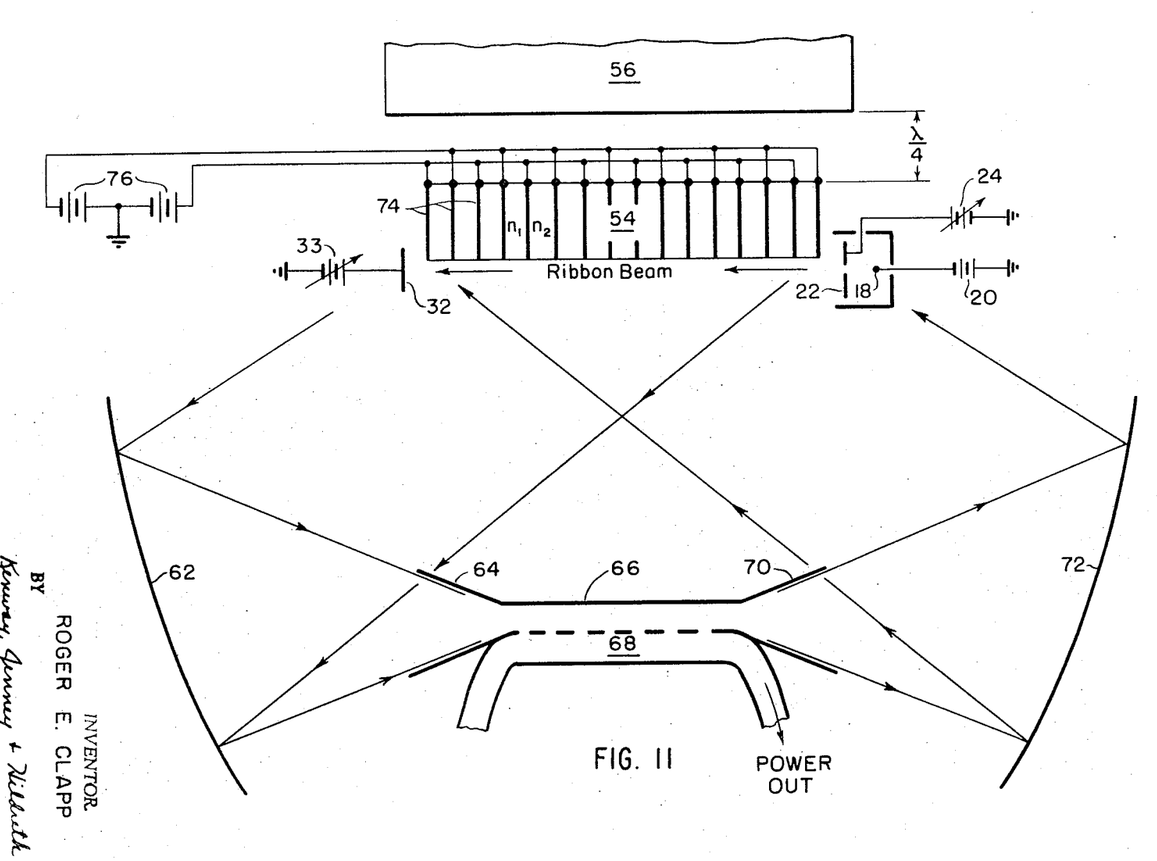
FIG. 11 is a schematic diagram showing a variant of the apparatus of FIG. 10.

FIG. 11 shows another approach to the prevention of undesired modes and waves of undesired frequencies. Like the embodiment of FIG. 10 the apparatus here shown is an oscillator utilizing a stack proportioned for half wavelength difference of electrical path lengths as between adjacent slabs on the round trip basis. The wave reflected from this stack strikes a concave mirror 62 proportioned to concentrate the reflected beam into a horn 64 at the throat of which is mounted a wave guide 66 of such dimensions that it will support only waves of the desired frequency and only in the desired mode. It may indeed be a tube of such minute cross-section that only the desired waves can pass through it. This tube provides a convenient point from which power can be withdrawn by way of a directional coupler 68. At the far end of the tube 66 another horn 70 directs the outgoing electromagnetic wave onto a second concave mirror 72 proportioned to direct its reflected beam onto the dielectric stack 54.

As in FIG. 10 reflection at the far ends of the dielectric slabs is enhanced by placement of a metal block 56 distant from this face of the stack 54 by quarter wavelength in whatever dielectric material separates the stack from the block, for example, air or vacuum.

It was remarked above that the electron beam may be caused to hug the face of the dielectric stack along which it passes by resort to alternating gradient focusing. As shown in FIG. 1 and stated for the other figures, the required alternating gradients may readily be provided, in the embodiment of FIG. 11, through the agency of the conducting sheets 74, one of which separates each slab from its neighbors on either side of it. To this end, odd numbered sheets are shown connected to the negative terminal of a potential source 76 while even numbered sheets are shown connected to its positive terminal, the midpoint of the source being grounded. The same arrangement may readily be introduced into each of the other embodiments shown above. It is omitted from those figures merely in the interest of simplicity of the drawings and presentation of the principles of the invention.

The metal backing block 56 of FIGS. 9, 10 and 11 may also serve another purpose, namely the withdrawal of heat which may be generated in the slabs in the course of operation. To this end the temperature of the block 56 may be kept to a desired low point by passing a cooling liquid through pipes which thread it.

The refractive indices of the materials selected to illustrate the invention in each of the foregoing embodiments stand so nearly in the relation of two-to-one that slabs of these materials can be cut to like lengths such that the electrical path length in the boron nitride slab is one half wavelength and that in the aluminum oxide slab is a whole wavelength. In such a case a difference of more than one half wavelength from slab to slab does not improve the electrical operation, though it may have structural advantages. However, when the refractive indices of the available dielectric materials differ widely from this advantageous two-to-one relation, it may be advisable to cut them to lengths such that their electrical path lengths differ by 3, 5, 7 or some other odd number of half wavelengths. Unduly great lengths, however, make for correspondingly large losses.

The more nearly the refractive indices of the available materials are alike, the greater number of wavelengths embraced in each slab. Thus, with refractive indices of 10 and 11, the slab of lower index would conveniently embrace five full wavelengths while the slab of higher index would embrace five and one-half wavelengths.

Various modifications of the illustrative embodiments described above will suggest themselves to those skilled in the art. For example, the illustrative interactions have in all cases been between the electrons of a stream and electromagnetic waves of very short wavelengths. There is no restriction in principle, however, to electromagnetic waves of any particular lengths, nor is there any restriction to a beam of negatively charged particles, electrons or otherwise. In principle, the interaction can take place between an electromagnetic wave and a stream of charged particles, either positive or negative, and of any masses. In the present state of development of technology the invention is believed to be of particular utility with waves of very short lengths, and the practice of the invention appears presently to be simplified by employing charged particles of very low masses and therefore, since the electron is the particle of lowest known mass, a stream of electrons; but, as indicated above, these considerations are matters of convenience and practical advantage in contrast to matters of principle.

An example of such an extension of the invention is furnished by a linear accelerator of charged particles, positive or negative, of a sort to provide them with the very high energies required in research in the physical sciences for determining the properties of matter. Thus, for example, the cylindrical stack of FIG. 3 which, as shown, is constituted of only five individual dielectric slabs, could be extended to include some five hundred or more such slabs of progressively greater thickness.

Bunches of charged particles generated by the entrance slabs of the stack or otherwise, and introduced into one end of a passage constituted of the apertures piercing the individual slabs, would then be accelerated from end to end of this passage. Such an arrangement is most efficient when the incident electromagnetic field is locally generated instead of being, as in the case of FIG. 3, received from a distant point. Preferably too, it is of high power. This could be achieved by the provision of a metal tube surrounding the elongated dielectric stack so that the configuration of the electromagnetic field between the stack and the tube resembles that in a coaxial transmission line, the surrounding metal tube replacing the outer conductor, while the elongated dielectric stack of the invention replaces the inner conductor.

Still other modifications of the invention within the scope of the appended claims will suggest themselves to those skilled in the art.

Having now described my invention, what I claim is:

1. Apparatus for developing from an incident electromagnetic wave, a modified wave of the same frequency which comprises:
    a multilayer stack consisting of a plurality of slabs of transparent dielectric material having indices of refraction that alternate from slab to slab between a first magnitude $n_1$ and a second magnitude $n_2$,
    the geometrical lengths of said slabs being alike, and so coordinated with their indices of refraction as to make for electrical path lengths that differ from slab to slab by an odd number of half wavelengths,
    and means for directing said wave upon first ends of all of said slabs.

2. Apparatus for developing from an incident electromagnetic wave of preassigned short wavelength and of plane wave front a modified wave of undulating wave front which comprises:
    a multilayer stack consisting of a plurality of slabs of transparent dielectric material having indices of refraction that alternate from slab to slab between a first magnitude $n_1$ and a second magnitude $n_2$,
    each slab being separated from its neighbors by a sheet of conducting material,
    the geometrical lengths of said slabs being alike and so coordinated with their indices of refraction as to make for end-to-end electrical lengths that differ from slab to slab by an odd number of half wavelengths,
    and means for directing said plane-front wave upon first ends of all of said slabs,
    whereby a wave of undulating front emerges from the second ends of all of said slabs.

3. Apparatus for developing from an incident electromagnetic wave of preassigned short wavelength and of plane wave front a modified wave of undulating wave front which comprises:
    a multilayer stack consisting of a plurality of slabs of transparent dielectric material having indices of refraction that alternate from slab to slab between a first magnitude $n_1$ and a second magnitude $n_2$,
    each slab being separated from its neighbors by a sheet of conducting material,
    the geometrical lengths of said slabs being alike and so coordinated with their indices of refraction that the slabs having the greater refractive index embrace one more half wavelength than do the slabs having the lesser refractive index,
    and means for directing said incident wave upon first ends of all of said slabs,
    whereby waves emerging from the other ends of said slabs alternate in polarity from slab to slab.

4. Apparatus for developing from an incident electromagnetic wave of preassigned short wavelength and having a wave front of preassigned configuration, a modified wave of the same frequency and having a wave front of different configuration which comprises:
- a multilayer stack consisting of a plurality of slabs of transparent dielectric material having indices of refraction that alternate from slab to slab between a first magnitude $n_1$ and a second magnitude $n_2$,
- each slab being separated from its neighbors by a sheet of conducting material,
- the geometrical lengths of said slabs being alike and so coordinated with their indices of refraction as to make for electrical path lengths that differ from slab to slab by an odd number of half wavelengths,
- and means for directing said incident wave upon first ends of all of said slabs.

5. Apparatus for promoting interaction between an electromagnetic wave of preassigned short wavelength and of plane wave front and a stream of electrons which comprises:
- a first group of slabs of transparent dielectric material of index of refraction $n_1$,
- a second group of slabs of a different transparent dielectric material of index of refraction $n_2$,
- the slabs of the second group being interleaved among the slabs of the first group so that each slab of either group has slabs of the other group as its nearest neighbors,
- a sheet of conducting material interposed between each slab and each of its neighbors,
- adjacent ones of said sheets thus constituting, with the slab between them, a dielectric-filled strip transmission time, the geometrical lengths of said lines being so coordinated with the indices of refraction of said slabs as to make for electrical path lengths of said lines that differ, from each line to its neighbors, by an odd number of half wavelengths,
- means causing said electromagnetic wave to be coupled to first ends of all of said lines,
- and means for passing a stream of electrons past the second ends of all of said lines.

6. Apparatus for promoting interaction between an electromagnetic wave of preassigned short wavelength and of plane wave front and a stream of electrons which comprises:
- a first group of slabs of transparent dielectric material of index of refraction $n_1$,
- a second group of slabs of a different transparent dielectric material of index of refraction $n_2$,
- the slabs of the second group being interleaved among the slabs of the first group so that each slab of either group has slabs of the other group as its nearest neighbors,
- a sheet of conducting material interposed between each slab and each of its neighbors,
- adjacent ones of said sheets thus constituting, with the slab between them, a dielectric-filled strip transmission line, the geometrical lengths of said lines being so coordinated with the indices of refraction of said slabs as to make for electrical path lengths of said lines that differ, from each line to one of its neighbors, by an odd number of quarter wavelengths,
- first ends of all of said lines being terminated for high internal reflection of wave energy traveling from end to end thereof,
- means causing said electromagnetic wave to be coupled to the other ends of all of said lines,
- and means for also passing a stream of electrons past said other ends of all of said lines.

7. In combination with apparatus as defined in claim 6, a body having a face of low resistance material juxtaposed with the first ends of said lines and spaced from said first ends by one quarter wavelength, whereby the effective terminating impedance at the first end of each of said lines is a high resistance.

8. Apparatus for promoting interaction between an electromagnetic wave of preassigned short wavelength and of plane wave front and a stream of electrons which comprises:
- a first group of slabs of transparent dielectric material of index of refraction $n_1$,
- a second group of slabs of a different transparent dielectric material of index of refraction $n_2$,
- the slabs of the second group being interleaved among the slabs of the first group so that each slab of either group has slabs of the other group as its nearest neighbors,
- a sheet of conducting material interposed between each slab and each of its neighbors,
- adjacent ones of said sheets thus constituting, with the slab between them, a dielectric-filled strip transmission line, the geometrical lengths of said lines being so coordinated with the indices of refraction of said slabs as to make for electrical path lengths of said lines, measured from an end of each line at which wave energy enters it to an end of said line at which wave energy emerges from it, that differ from each line to its neighbors by an odd number of half wavelengths,
- means for directing said electromagnetic wave upon the entrance ends of all of said lines,
- and means for passing said stream of electrons past the emergence ends of all of said lines.

9. Apparatus for deriving from an electromagnetic wave of preassigned frequency electron bunches in a stream of electrons which comprises a stack of slabs of dielectric material separated by sheets of conducting material,
- even numbered ones of said slabs having refractive indices $n_1$ and odd numbered ones of said slabs having refractive indices $n_2$, said refractive indices being so coordinated with the geometrical lengths of said slabs as to provide them with electrical path lengths, measured from ends at which wave energy enters said slabs to ends at which it emerges from said slabs, that differ by an odd number of half wavelengths,
- means for directing said wave with a plane wave front on entrance ends of all of said slabs,
- whereby the wave emergent from said slabs has a front that undulates across said slabs with an undulation wavelength comparable with the thickness of two slabs and of two conducting sheets,
- and means for passing said stream of electrons past said emergence ends in a direction parallel with the thickness dimension of said slabs.

10. Apparatus for deriving from an electromagnetic wave of preassigned frequency electron bunches in a stream of electrons which comprises:
- a stack of slabs of dielectric material separated by sheets of conducting material,
- even numbered ones of said slabs having refractive indices $n_1$ and odd numbered ones of said slabs having refractive indices $n_2$, said refractive indices being so coordinated with the geometrical lengths of said slabs as to provide them with electrical path lengths, measured from ends at which wave energy enters said slabs to ends at which it emerges from said slabs, that differ by one half wavelength,
- means for directing said wave with a plane wave front on entrance ends of all of said slabs,
- whereby portions of said incident wave that pass through adjacent ones of said slabs emerge substantially in phase opposition, thereby to develop, at the emergence ends of said slabs, a wave having a front that undulates across said slabs with an undulation wavelength comparable with the thickness of two slabs and of two conducting sheets, and means for passing said stream of electrons past said emergence ends in a direction parallel with the thickness dimension of said slabs.

11. Apparatus for deriving from an electromagnetic wave of preassigned frequency electron bunches in a stream of electrons which comprises a stack of slabs of dielectric material separated by sheets of conducting material, even numbered ones of said slabs having refractive indices $n_1$ and odd numbered ones of said slabs having refractive indices $n_2$, said refractive indices being so coordinated with the geometrical lengths of said slabs as to provide them with electrical lengths that differ by an odd number of half wavelengths, means for directing said wave with a plane wave front on first ends of all of said slabs, whereby the wave emergent from the second ends of said slabs has a front that undulates across said slabs with an undulation wavelength comparable with the thickness of two slabs and of two conducting sheets, and means for passing said stream of electrons past said second ends in a direction parallel with the thickness dimension of said slabs.

12. Apparatus for deriving from an electromagnetic wave of preassigned frequency electron bunches in a stream of electrons which comprises a stack of slabs of dielectric material separated by sheets of conducting material, even numbered ones of said slabs having refractive indices $n_1$ and odd numbered ones of said slabs having refractive indices $n_2$, said refractive indices being so coordinated with the geometrical lengths of said slabs as to provide them with electrical lengths that differ by an odd number of half wavelengths, means for directing said wave with a plane wave front on first ends of all of said slabs, whereby portions of said incident wave that pass through adjacent ones of said slabs emerge from their second ends substantially in phase opposition, thereby to develop, at the second ends of said slabs, a wave having a front that undulates across said slabs with an undulation wavelength comparable with the thickness of two slabs and of two conducting sheets, and means for passing said stream of electrons past said second ends in a direction parallel with the thickness dimension of said slabs.

13. Apparatus for developing from a stream of electron bunches an electromagnetic wave of essentially plane wave front which comprises a plurality of slabs of transparent dielectric material arranged in a stack, each separated from its neighbors by a conducting sheet, the refractive indices of the materials of said slabs alternating, from slab to slab, between a first magnitude $n_1$ and a second magnitude $n_2$, the geometrical lengths of said slabs being so coordinated with said refractive indices that the electrical length of each slab differs by one half wavelength, at a presassigned frequency, from the electrical lengths of the adjacent slabs, means for passing a bunched electron beam along a face of said stack in a direction parallel with the thickness dimension of said slabs and at a velocity such that successive bunches pass by any point of said stack at said frequency, the spacing between adjacent bunches of said beam being substantially twice the thickness of a slab and a bounding sheet, whereby said bunches induce electric fields of opposite polarities in adjacent ones of said slabs, whereupon said induced fields are propagated as electromagnetic waves to the other ends of said slabs, these to emerge in phase coincidence as a composite wave of plane front.

14. Apparatus for developing from a stream of electron bunches an electromagnetic wave of essentially plane wave front which comprises a plurality of slabs of transparent dielectric material arranged in a stack, each separated from its neighbors by a conducting sheet, the refractive indices of the materials of said slabs alternating, from slab to slab, between a first magnitude $n_1$ and a second magnitude $n_2$, the geometrical lengths of said slabs being so coordinated with said refractive indices that the round trip electrical path length within each slab differs by one half wavelength, at a preassigned frequency from the round trip electrical path lengths within the adjacent slabs, means for passing a bunched electron beam along a face of said stack in a direction parallel with the thickness dimension of said slabs and at a velocity such that successive bunches pass by any point of said stack at said frequency, the spacing between adjacent bunches of said beam being substantially twice the thickness of a slab and a bounding sheet, whereby said bunches induce electric fields of opposite polarities in adjacent ones of said slabs, whereupon said induced fields are propagated as electromagnetic waves through said slabs, to emerge in phase coincidence as a composite wave of plane front.

15. Apparatus as defined in claim 8 wherein the several strip lines are proportioned to have thicknesses $d$ that satisfy the relation $$2\frac{d}{v} = \frac{\lambda + 2d \sin \theta}{c}$$

where $v$ is the velocity of the stream of electrons, $\lambda$ is the wavelength of the incident wave, $\theta$ is its angle of incidence, and $c$ is its propagation velocity.

16. An omnidirectional frequency selective radiation receptor which comprises a stack of circular discs of dielectric material separated by sheets of conducting material, each disc and each sheet being pierced by a central aperture, even-numbered ones of said discs having refractive indices $n_1$ and odd numbered ones of said discs having refractive indices $n_2$, said refractive indices being so coordinated with the radii of said discs as to provide them with electrical path lengths in the radial direction from outer periphery to inner periphery that differ from disc to disc by an odd number of half wavelengths at a preassigned frequency, said stack being disposed to receive radiation of said frequency on the outer peripheries of said discs, means for passing a stream of electrons through said apertures with a transport velocity such that it travels a distance substantially equal to twice the thickness of a disc in each period of said radiation, whereby electric fields are induced in said discs by said radiation, and travel through them radially inward to the apertures, there to modulate the velocities of the stream electrons, means for converting said velocity modulations into electron bunches, and means for deriving amplified energy of said frequency from said bunches.

17. Apparatus for generating electromagnetic waves of quasi-optical frequencies which comprises an odd number of reflectors disposed to define a closed loop path having an odd number of legs and embracing an integral number of half wavelengths, means for generating a stream of electrons, means coupled to a first part of said path for bunching electrons of said stream under control of waves in said first path part, means coupled to a second part of said path for deriving amplified wave energy from electron bunches of said stream and for delivering it to said second path part, at least a part of said path including means for withdrawing amplified wave energy.

18. Apparatus as defined in claim 17 wherein at least one leg of said path is bounded by conductive walls, and wherein the energy-withdrawing means a directional coupler that is integral with one of said walls.

19. Apparatus as defined in claim 17 wherein the reflection coefficient of at least one of said reflectors is less than unity, whereby energy is withdrawn from said closed loop path by transmission through said reflector.

20. In combination with apparatus as defined in claim 17, a waveguide having an input port and an output port, the cross section of said wave guide being many times smaller than the cross section of the electromagnetic wave beam, wherein said reflectors are three in number, wherein a first of said reflectors is plane, wherein a second of said reflectors is concave and disposed to concentrate wave energy received from said first reflector onto said input port, and wherein a third of said reflectors is concave and disposed to direct wave energy received from said output port onto said first reflector.

No references cited.

HERMAN KARL SAALBACH, *Primary Examiner.*

S. CHATMON, JR., *Assistant Examiner.*